United States Patent [19]

Emmons et al.

[11] 4,395,524

[45] Jul. 26, 1983

[54] ACRYLAMIDE COPOLYMER THICKENER FOR AQUEOUS SYSTEMS

[75] Inventors: William D. Emmons, Huntingdon Valley; Travis E. Stevens, Ambler, both of Pa.

[73] Assignee: Rohm and Haas Company, Philadelphia, Pa.

[21] Appl. No.: 252,721

[22] Filed: Apr. 10, 1981

[51] Int. Cl.$^3$ .................. C08F 220/54; C08F 220/56; C08F 220/58

[52] U.S. Cl. ................................ 526/307.2; 524/555; 526/264; 526/304

[58] Field of Search ...................... 526/304, 307.2, 264

[56] References Cited

U.S. PATENT DOCUMENTS

| | | | |
|---|---|---|---|
| 2,816,882 | 12/1957 | Schiller | 260/86.1 |
| 3,326,868 | 6/1967 | Tucker | 526/304 |
| 3,491,070 | 1/1970 | Weaver | 526/307.2 |
| 3,963,684 | 6/1976 | Evani et al. | 526/303 |
| 3,970,606 | 7/1976 | Field et al. | 526/260 |
| 4,029,872 | 6/1977 | Evani et al. | 526/303 |
| 4,029,873 | 6/1977 | Evani et al. | 526/303 |
| 4,029,874 | 6/1977 | Evani et al. | 526/304 |
| 4,079,028 | 3/1978 | Emmons et al. | 260/29.6 |
| 4,098,987 | 7/1978 | Barua et al. | 526/304 |
| 4,129,545 | 12/1978 | Sunamori et al. | 526/304 |
| 4,151,333 | 4/1979 | Lenke | 526/307.2 |
| 4,154,910 | 5/1979 | Tanaka et al. | 526/307.2 |

FOREIGN PATENT DOCUMENTS

| | | |
|---|---|---|
| 1186829 | 12/1964 | Fed. Rep. of Germany . |
| 893005 | 4/1962 | United Kingdom . |
| 1079603 | 8/1967 | United Kingdom . |

Primary Examiner—Harry Wong, Jr.
Attorney, Agent, or Firm—H. L. Greenwald; A. R. Sluzas

[57] ABSTRACT

Nonionic and anionic water-soluble addition copolymers of acrylamide and N-substituted acrylamides are useful as flow modifiers in and as adsorbates from aqueous systems, particularly multiphase systems. The copolymers have a weight average molecular weight greater than 30,000 and are useful for many purposes including as thickening agents or rheology modifiers for water based systems, block improvement additives in water based coating formulations, and transfer aids in water based ink or roll coater formulations.

17 Claims, No Drawings

ACRYLAMIDE COPOLYMER THICKENER FOR AQUEOUS SYSTEMS

BACKGROUND OF THE INVENTION

This invention relates to a flow modifier for aqueous systems which is also an effective adsorbate onto solids from aqueous systems. The modifier is a copolymer of acrylamide and an N-substituted acrylamide. The N-substituent comprises a hydrophobic group of an effective size. Aqueous solutions of such an acrylamide copolymer have higher viscosities than aqueous solutions of a polyacrylamide of similar molecular weight without hydrophobic groups, when measured at concentrations such as 0.1% or more. Multiphase compositions, comprising a continuous aqueous phase and at least one other phase, containing the acrylamide copolymer flow modifier have a surprising combination of desirable properties, particularly rheological properties, in a number of uses. Typical of these uses are paint and printing ink modifications, emulsion stabilization, and pigment dispersion.

High molecular weight polyacrylamide and partially hydrolyzed derivatives thereof have long been known as thickeners for water and in various other uses as reported in "Handbook of Water Soluble Gums and Resins", R. L. Davidson, Ed., McGraw Hill 1980, Chapter 16 by Volk and Friedrich. Processes for preparing polyacrylamide are old in the art; Minsk et al., U.S. Pat. No. 2,486,191, teach solution polymerization in aqueous alcohol solution, Monagle et al., U.S. Pat. Nos. 3,336,269, 3,336,270 and 3,509,113, teach a precipitation process employing tertiary butanol, and optionally acetone, in water as the polymerization medium.

A large hydrocarbyl substituent on the amide nitrogen of the required comonomer is believed to be responsible for leading to many of the unusual and unexpected properties of the acrylamide copolymers of the instant invention and of their aqueous solutions. Among these properties is the surprising increase in viscosity of an aqueous solution as the concentration of the polymer is increased, as compared to polyacrylamide.

Similarly, unusual behavior is found in the rheological properties of emulsions, suspensions and other multiphase systems, such as those containing both liquid and solid phases (mixed emulsions and suspensions), comprising this acrylamide copolymer in aqueous solution or at an aqueous interface. Further novel effects are noted when systems containing the acrylamide copolymer of the instant invention are dried and ease of bonding to the exposed surface is determined. It is seen that bonding is poor, especially the bonding between two coated surfaces (i.e., so-called "blocking") and it is concluded that the acrylamide copolymer is a surprisingly adhesion inhibiting adsorbate. The thickeners or flow modifiers of the invention are exceptionally versatile in their ability to impart special rheological properties to aqueous solutions and to multiphase solutions comprising an aqueous continuous phase. They are relatively efficient viscosity improvers at comparatively low molecular weights and at the same time provide improved rheological properties to aqueous solutions and systems subjected to high or low shear rate. An example of these improvements is found in latex paints containing the modifiers of this invention formulated so as to provide, in a single paint formulation, superior flow and leveling, desired viscosity values under both low shear and high shear conditions and applied coatings having high gloss, and resistance to blocking.

It is believed that a number of the unusual properties of the acrylamide copolymer, for example, latex stabilization and block improvement, are aided by adsorption of the polymer from the aqueous phase onto solid surfaces, such as latex particle surfaces and pigment surfaces, which may be present. The adsorption results in the presence of thickener molecules at the surface of films, formed upon drying a latex or other solid-containing formulations utilizing the acrylamide copolymer, which presence leads to unexpected surface properties.

Water soluble thickeners are notoriously difficult to handle in industrial processes because, when furnished as solids they take inordinately long times to dissolve, or when furnished as concentrated solutions they are difficult to dilute uniformly so as to avoid the production of local areas of high concentration, often known as "fisheyes" because of their appearance. Both in simple aqueous solution and, more particularly, in formulations comprising other phases, extended agitation and aging periods are required before an equilibrium viscosity is attained. This requires formulators to guess or develop rule of thumb methods for estimating the final equilibrium rheological properties of the formulations or to inventory large amounts of product and reprocess it if the final rheological properties do not meet an established specification. One of the advantages of the acrylamide copolymers of this invention is the rapidity with which equilibrium rheological properties are attained. This rapid equilibration may be due to the high viscosity of the aqueous copolymer solutions, at concentrations above about 0.1%, for such relatively small copolymer molecules. Thus, one may regard the aqueous solutions as having a viscosity to be expected of high molecular weight polyacrylamides while, at the same time, insofar as diffusional characteristics, such as the rate of concentration equilibration, are concerned, the acrylamide copolymer behaves as though the molecular weight is comparatively low. This is both a surprising property and one of great importance in the manufacture of multiphase systems.

The rapid equilibration, in the distribution in solution, of the acrylamide copolymers of this invention may be considered to be associated with the unusual rheological properties of systems thickened thereby. Without being bound by the theories expressed or implied, the following remarks are offered as an aid in the teaching of this invention. The introduction of these thickener polymers into a solution is thought to promote a specific structure in the solution phase or an interaction among phases resulting in a structure. If the structure is resistant to change throughout a broad range of shear rates, then its rheology profile is Newtonian, that is, its apparent viscosity is relatively independent of shear rate. If the structure is not shear resistant, but degrades under shear and does not reform as fast as the degradation, then its rheological profile will be less Newtonian and more pseudoplastic.

A water soluble high molecular weight polymer added to an aqueous phase readily gives an increased viscosity as measured at a given low shear rate. However, as the shear rate is increased, it is commonly observed that the viscosity diminishes, that is, the solution appears to have pseudoplastic rheology. This may be due to the original structure not being maintained because the high molecular weight polymer molecules do not permit rapid equilibration of their distribution in the solution. Because of the unexpectedly high rate of equilibration, the thickeners of this invention exhibit a Newtonian-proximate rheology even at high shear rates.

The nonionic acrylamide copolymers of this invention have outstanding tolerance for electrolytes in the sense that the rheological properties of their aqueous solutions are comparatively insensitive to electrolytes as well as to changes in pH. The lack of sensitivity to pH changes is, in part, due to the stability to hydrolysis of the linkage between the hydrophobic group and the polymer backbone. Most polymer latex particles and other solids in industrial use being nonionic or anionic, the anionic acrylamide copolymers of this invention are of widespread applicability even if less tolerant of electrolytes. However, cationic acrylamide copolymers would not be so useful for they would lead to floccolation and gellation of such systems as well as being electrolyte and pH sensitive. The viscosity of aqueous solutions thickened by acrylamide copolymers of this invention is less sensitive to shear than solutions of the same viscosity thickened by prior art materials.

The acrylamide copolymers can be prepared with hydrophobe-containing chain transfer agents and, optionally, hydrophobe-containing initiators.

Formulated with a wide variety of aqueous systems comprising small particles, such as latexes, these acrylamide copolymers afford multiphase systems of great commercial interest such as paints, printing inks and other systems comprising a thickened aqueous phase. An example of such materials are gloss paints which are found to have an excellent balance of low shear and high shear viscosity, exceptional flow, leveling and film build and which produce resulting paint films having high gloss, block resistance, and, when compared to formulations comprising conventional nonionic thickeners such as hydroxyethyl-cellulose or anionic thickeners, have better alkali and abrasion resistance and resistance to degradation such as by shearing or by enzymes. In general, the acrylamide copolymers of the instant invention are also effective sedimentation stabilizers, surfactants, and dispersants.

BRIEF DESCRIPTION

The composition of this invention is an aqueous solution of a water soluble, vinyl addition copolymer of, by weight, at least 50% acrylamide, 0.01 to 50%, an N-substituted acrylamide and, optionally up to 49.99% other vinyl monomers. The substituent on the nitrogen of acrylamide is hydrocarbyl and has 6 or more carbon atoms or is such a hydrocarbyl group attached to the nitrogen via a polyoxyalkylene chain. The weight average molecular weight of the copolymer is greater than 30,000. In a further embodiment, this invention is concerned with a multiphase composition comprising an aqueous phase and at least one other phase, wherein the multiphase composition comprises the water-soluble, vinyl addition copolymer of acrylamide.

DETAILED DESCRIPTION

The acrylamide copolymer of this invention is a nonionic or anionic water-soluble addition polymer of monomers comprising, by weight,
(A) at least 50% of acrylamide;
(B) 0.01 to 50% of a compound having the formula

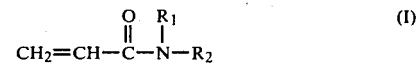

wherein
$R_1$ is

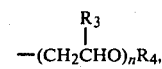

$R_2$ is -H or

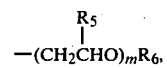

$R_3$ and $R_5$ are H or $CH_3$, independently,
$R_4$ and $R_6$ are hydrocarbyl having 6, or more carbons, independently, and
m and n are zero or a positive integer, independently; and
(C) 0 to 49.9% one or more other olefinically ununsaturated monomers; the copolymer having a weight average molecular weight greater than 30,000.

The preferred N-substituted acrylamide is a mono-N-alkylacrylamide, $CH_2=CHCONHR_1$, having an alkyl group ($R_1$) containing 6 to 36, preferably 8 to 18 and most preferably 10 to 14 carbon atoms, m and n being zero. The alkyl group can be either linear or branched although monomers with linear alkyl groups afford more efficient thickeners than monomers with branched alkyl groups having the same number of carbon atoms. Of the many N-alkylacrylamides suitable for our thickeners, those obtainable via the reaction of an α-olefin with acrylonitrile in sulfuric acid are particularly conveniently prepared. For example:

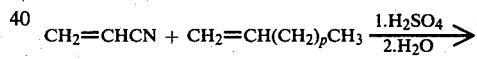

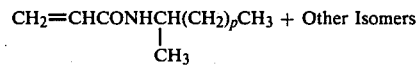

As indicated, this reaction generally gives an isomeric mixture of monomers having varying degrees of branching at the carbon atom adjacent to the amide function. Use of 1-octene (p=5), for example, yields a mixture of N-(2-octyl)-, N-(3-octyl)-, and N-(4-octyl)acrylamide, respectively. Either the individual monomers or the mixture of monomers can be utilized in our thickeners; they have the formula $CH_2=CHCONHCHR_7R_8$.

The level of the N-substituted acrylamide in the copolymer is 0.01 to 50%, preferably 0.05 to 20% and more preferably 0.1 to 10%. Larger alkyl groups, $R_4$ and $R_6$ of Formula I, are more effective than smaller ones, so a table showing the desirable level of N-substituted acrylamide in the copolymer as a function of the number of effective carbons in the $R_4$ and $R_6$ groups is useful. The number of effective carbons is the number of carbons in the longest chain in the $R_4$ and $R_6$ groups plus half of the number of remaining carbons in $R_4$ and $R_6$. If a mixture of N-substituted acrylamides is used the average number of effective carbons, by weight, is the number to be used in conjunction with the table.

| EFFECTIVE CARBON NO. | LEVEL OF N—SUBSTITUTED ACRYLAMIDE | |
|---|---|---|
| | DESIRABLE | MORE DESIRABLE |
| 6-9 | 2-40% | 4-20% |
| >9-12 | 0.5-30 | 1-15 |
| >12-15 | 0.4-20 | 0.5-10 |
| >15-18 | 0.2-10 | 0.4-8 |
| >18 | 0.05-8 | 0.2-5 |

Hydrocarbyl groups comprising aromatic units are less preferred because on exposure to radiation molecules comprising such units tend to discolor. Hydrocarbyl groups at the end of long polyether chains are also less preferred because when warmed in the presence of air, particularly under alkaline conditions, such chains tend to decompose, with a probability increasing with chain length. It is preferred that the polyether chains have fewer than 50 units with fewer than 15 units being more preferable. A special case of a less desirable ether linkage is an oxymethylene linkage, particularly a substituted methylol acrylamide, which is readily hydrolyzed at low pH.

Other well established methods of preparing N-alkylacrylamides can also be employed. Included are the base-induced dehydrohalogenation of N-alkyl-$\beta$-chloropropionamides, the pyrolysis of N-alkyl-$\alpha$- or $\beta$-substituted propionamides, the carbonylation of acetylene in the presence of alkylamines and nickel carbonyl, the oxidative carbonylation of ethylene in the presence of alkylamines and metal catalysts, the amidation of acryloyl chloride with alkylamines, the rearrangement of $\beta$-aminoacrylates, the reaction of acrylonitrile with alkylamines and water, the gas phase amidation of acrylic acid in the presence of dehydration catalysts, and the reaction of potassium acrylamide with appropriate alkyl halides.

Of lesser import, though still within the scope of this invention, are N,N-dialkylacrylamides wherein at least one of the alkyl groups has 6-36 carbon atoms. The alkyl groups can be identical or non-identical, although the latter is preferred for steric reasons.

The polymer is preferably a copolymer of acrylamide and one or more N-substituted acrylamides. In other embodiments, it is a copolymer of these amides and other vinyl monomers, preferably hydrophilic, such as hydroxypropyl acrylate, hydroxyethyl methacrylate, hydroxyethyl acrylate, methacrylic acid, acrylic acid, and especially, N-vinylpyrrolidone. Ionic acrylamide copolymers are made by copolymerization with ionizable monomers, preferably methacrylic acid, acrylic acid and itaconic acid. Nonionic copolymers are prepared employing N-vinylpyrrolidone or the hydroxyalkyl acrylates or methacrylates or hydroxy-, alkoxy-, or polyalkoxyalkyl acrylates and methacrylates, the preferred alkyl groups in these compounds having 2 to 4 carbon atoms and most preferably 2 or 3, i.e., being ethoxy or propoxy materials.

The weight average molecular weight of the acrylamide copolymer is greater than 30,000, especially 30,000 to 2 million to insure appropriate thickening ability. A preferred molecular weight range is from 50,000 to 1 million with the range 100,000 to 700,000 being most preferred and particularly leading to a shear stable effective thickener for aqueous solutions and multiphase systems containing a continuous aqueous phase.

The acrylamide copolymer is a product of free radical polymerization, preferably conducted in an atmosphere substantially free of oxygen and employing a free radical initiator at the usual levels, such as between 0.05 and 20 milliequivalents per 100 grams (meq/100 g) monomer. A chain transfer agent may be employed over a wide range of concentration with 0.05 to 20 meq/100 g monomer being preferred and 0.5 to 5 being more preferred. In one embodiment, the initiator of the chain transfer agent, preferably the latter, is substantially water insoluble and comprises an effective hydrophobic group. An effective hydrophobic group is one resulting in the aqueous solution of the acrylamide copolymer having an unusually high viscosity at a given polymer molecular weight and over a certain minimum solution concentration. The hydrophobic group is preferably a hydrocarbyl group comprising at least 8 carbon atoms, preferably between 10 and 36 carbon atoms, more preferably between 12 and 22 carbon atoms, such as in lauryl, t-dodecyl, n-tetradecyl, n-hexadecyl, and n-octadecyl mercaptans. Substantially water insoluble, in this context, means having a low solubility in water preferably less than 0.1% and more preferably less than 0.01% and most preferably less than 0.001% by weight.

Acrylamide-rich copolymers with N-alkylacrylamides are preferred compositions. However, other hydrophilic monomers, preferably water-soluble, can be substituted for acrylamide, at up to 50% of the polymer by weight, preferably up to 30%, most preferably up to 20%, for the purposes of this invention.

Other hydrophilic monomers which can be used are acrylonitrile, methacrylonitrile, alkyl-phosphato-alkyl acrylates and methacrylates, alkyl-phosphono-alkyl acrylates and methacrylates, maleic acid, maleic anhydrides, fumaric acid, itaconic acid, also half acid forms of the above dibasic acids such as half esters, other alkyl and substituted alkyl amides of acrylic acid, methacrylic acid, maleic acid (mono- and di-amides), fumaric acid (mono- and di-amides), and itaconic acid (mono- and di-amides), methacrylamide, diacetone acrylamide, alkyl vinyl ethers, such as butyl vinyl ether, and ureido monomers, including those with cyclic ureido groups, and the like. Many others will occur to those skilled in the art, and the scope of the present invention should be interpreted to include such hydrophilic monomers generally. The proper scope of the invention should also be interpreted to include variations on the inclusion of the hydrophilic monomer, such as, for example, when a monomer is included in the polymerization mix which is not itself hydrophilic, but is altered in processing or in a subsequent step, e.g., by hydrolysis or the like, to provide hydrophilicity; anhydride- and epoxide-containing monomers are examples. Other examples are the esters of vinyl alcohol such as vinyl formate, vinyl acetate, vinyl propionate, vinyl butyrate, and vinyl versatate. Hydrolysis of these monomers produces vinyl alcohol mer units in the polymer which mer units are hydrophilic. The preferred monomer of these is vinyl acetate.

Another embodiment comprises polymers with low levels, preferably less than 10%, more preferably less than 5% or even 2%, of small hydrophobic monomers such as styrene, vinyltoluene, alpha-methylstyrene, esters of alpha, betaethylenically unsaturated acids and alcohols having one to six carbons (except those of high solubility in water which are thus properly classified as hydrophilic, examples being methyl and ethyl acrylate and methacrylate), vinyl chloride, chlorostyrene, vinyl acetate, butadiene, chloroprene, isobutene, isoprene, ethylene, propylene, and esters of vinyl alcohol and one to five carbon acids. Such small hydrophobic monomers have fewer than nine carbon atoms or, after polymerization, produce new units with groups pendant from the polymer backbone of fewer than eight carbon atoms.

The introduction of a hydrophobe at a terminus of the polymer chain can be effected with a hydrophobe-containing initiator, a hydrophobe-containing chain transfer agent, or some combination of initiator and chain transfer agent. Among the preferred hydrophobe-containing initiators are lauroyl and stearoyl peroxide. Many other initiators of this type are, of course, also acceptable. An important criterion, in the selection of the initiator, is that the functionality by which the hydrophobe is attached to the polymer chain be hydrolytically stable over the pH range of interest in the specific application. Among preferred non-hydrophobe-containing initiators are sodium, potassium, or ammonium persulfate, either alone or in the presence of suitable reducing agents. Here again, other initiators or initiating systems are also acceptable.

Desirable levels of initiator range from 0.00002 to 0.20 meq per gram of monomer and, preferably, from 0.0002 to 0.002 meq per gram of monomer.

The chain transfer agents in this invention may serve a dual purpose: (1) regulation of polymer molecular weight, and (2) introduction of hydrophobe(s), for enhanced thickening in many cases.

While the level of initiator is important in determining product molecular weight, it is often advantageous to control molecular weight with chain transfer agents as well. A preferred chain transfer agent is isopropanol at levels of 0.1 to 50 wt. % of total solvent, although levels of 0.5 to 10 wt. % are generally sufficient. Other solvents can be used for this purpose. Alternatively, more conventional chain transfer agents such as mercaptans or halogens can be employed; mercaptopropionic acid and 2-hydroxyethyl mercaptan, for example, perform well. Especially useful are alkyl mercaptans with linear or branched alkyl groups having 6–36 carbon atoms. Such mercaptans permit the introduction of an additional hydrophobe at a terminus of the polymer chain in much the same manner described for hydrophobe-containing initiators. Among the most important of these mercaptan chain transfer agents are n-hexyl, n-heptyl, n-octyl, sec-octyl, n-nonyl, n-decyl, n-dodecyl, t-dodecyl, n-tetradecyl, n-hexadecyl, and n-octadecyl mercaptans. Also quite useful are water-soluble hydrophobe-containing mercaptans such as those derivable from ethoxylated fatty alcohols by standard functional group transformations.

The level of chain transfer agent can vary considerably, usages of 0.00005 to 0.015 meq of chain transfer agent per meq of monomer encompass the polymer molecular weights of primary interest. Polymers having optimum properties in coating applications are more specifically obtained with 0.00025 to 0.005 meq of chain transfer agent per meq of monomer.

The hydrophobe introduced via the chain transfer agent is most desirably attached to the polymer chain by a linkage hydrolytically stable at the pH of the application.

The polymerization reaction can be carried out by any of a number of techniques well known to persons skilled in the art. The preferred method is solution polymerization in water or water/cosolvent mixtures. A less preferred method is precipitation polymerization in polar organic solvents such as methanol, ethanol, n-propanol, isopropanol, n-butanol, sec-butanol, isobutanol, ter-butanol, ethylene glycol monoalkyl ether wherein the alkyl is methyl, ethyl or butyl, the corresponding diethylene glycol ethers, acetone, methyl ethyl ketone, ethyl acetate, acetonitrile, dimethyl sulfoxide, N,N-dimethylformamide, tetrahydrofuran, dioxane, and the like, as well as mixtures of these solvents with or without water. It should be noted that some of the aforecited solvents function as efficient chain transfer agents and will thus effect the molecular weight of the product polymer to a considerable extent.

In the solution polymerization method, the product is obtained in the form of an aqueous solution of translucent dispersion depending upon its precise composition and the purification procedures subsequently employed. In the precipitation polymerization method, the product is recovered as a friable solid by filtration and air-drying. Other modes of polymerization, of course, are also applicable.

Methods of polymerization other than solution polymerization in water or a water-cosolvent mixture often have marked disadvantages in commercial practice. Examples of problems of difficulties which may add to the cost of a polymer in commercial practice can be found in the precipitation polymerization method. Precipitation polymerizations are generally limited to rather low solids, such as 10 to 15%, because of viscosity considerations and because of the highly exothermic nature of acrylamide polymerization. On precipitation, the product generally occludes large quantities of solvent forming a thick slurry which is quite difficult to stir. Isolation of the product requires filtration of a voluminous precipitate which generally proceeds slowly and poses handling problems. The filtered product requires extensive air drying for the release of the occluded solvent, posing a choice between long times, reduced pressures or elevated temperatures; all adding to the expense, particularly in view of the possible environmental hazard. The product being in solid form then requires the end user to dissolve the product in water prior to formulation.

A preferred method of polymerization utilizes water or water/cosolvent mixtures, the cosolvent being chosen from amongst tert-butanol, the most preferred, and the monobutyl ether of ethylene glycol or diethylene glycol. The level of these cosolvents may be from 0 to 50% by weight depending on the nature and solubility characteristics of the N-alkylacrylamide, initiator, and chain transfer agent. Polymerization is initiated thermally, the optimum reaction temperature then being determined by the initiator used, or by a redox process started at or about ambient temperature. As the polymerization is highly exothermic, provision must be made to control the temperature of the reaction mixture either by external cooling or by solvent reflux. The polymerization can employ a "one-shot" procedure wherein all of the monomer and initiator are present in the reactor at the onset of initiation, or by a gradual addition procedure wherein both monomer and initiator are slowly added to the reactor. When the "one-shot" procedure is used, it is advisable to limit the monomer content of the reactor during the process to less than 15 wt. %. Total reaction solids, however can be increased to a maximum of 20–30 wt. % by successive "one-shot" polymerizations in the reactor upon conversion of all of the preceeding monomer charge. At the end of the procedure, residual monomer is consumed with additional initiator or by any of the other well established methods. If cosolvent is employed in the procedure, it is sometimes desirable to remove that cosolvent upon completion of the polymerization to afford the product in water alone. In such instances, tert-butanol is the preferred cosolvent since it can readily be distilled from the product in vacuo or a via a steam sparge, the tert-butanol forming a very efficient azeotrope with water (88.2% tert-butanol/11.8% water, bp. 79.7° C.).

The copolymers per se or their solutions are used for controlling the viscosity of polymeric latices of natural or synthetic water-insoluble polymers. It is preferred that the solutions, as prepared, be used to thicken the polymeric latices. However, the polymers can be isolated from the solutions as solid products which can be added to the polymeric latices. The solutions can be further diluted with water to lower solids content and the dilute solutions added to the latices. Also, the copolymers can be dispersed in another liquid medium or dissolved in another solvent through a solvent exchange before they are added to the latices. The particular technique used will depend on the type latex to be thickened.

Illustrative polymeric latices are dispersions, emulsions, suspensoids and the like of the following polymers: acrylics, vinyl acetate homopolymers or copolymers, styrene-butadiene, carboxylated styrene-butadiene, polystyrene, polyvinyl alcohol, natural rubber, vinyl chloride homopolymers and copolymers, chloroprene, polyacrylonitrile, acrylonitrile-butadiene and butyl rubber. More particular polymers are homopolymers and copolymers of acrylonitrile with a diene like isoprene, butadiene or chloroprene; copolymers of styrene; homopolymers and copolymers of vinyl halide resins, like vinyl chloride and vinylidene chloride, with each other or acrylonitrile or vinyl esters such as vinyl acetate; vinyl acetate homopolymers and copolymers with ethylene and acrylates; copolymers of styrene and unsaturated acid anhydrides like maleic anhydride; homopolymers and copolymers of acrylic and methacrylic acid and their esters and derivatives; polybutadiene; polyisoprene, ethylene-propylene copolymers; olefinic resins like polyethylene, polypropylene; polyvinyl alcohol; carboxylated natural and synthetic latices and similar polymeric materials. Acrylic polymer latices are preferred. An amount of thickener (acrylamide copolymer) sufficient to give a thickening effect is used. Generally, the concentration of thickener will be between 0.1 and 15% by weight of the emulsion (latex) solids, preferably between 1 and 10%.

The thickener of the invention is particularly useful in improving the rheology of aqueous polymeric latices and latex paints, particularly those paints described in U.S. Pat. No. 2,795,564 issued June 11, 1957 to Conn et al. and U.S. Pat. No. 3,356,627 issued Dec. 5, 1967 to Scott. The disclosures of these patents with respect to particularly useful acrylic polymeric dispersions are hereby incorporated by reference.

In preparing coating compositions, particularly paints, pigments as well as other conventional paint ingredients can be added to the coating compositions of the invention. Conventional pigments can be used either alone or in combination. Illustrative are rutile titanium dioxide, anatase titanium dioxide, carbon black, lamp black, finely divided kaolin clays, chrome yellow, chrome green, black iron oxide, "Monastral" green pigment, "Monastral" blue pigment, "Dalamar" yellow pigment, lithopone, and the like. These pigments can be extended with conventional extenders such as diatomaceous silica, calcium carbonate, barium sulfate, talc, various clays, mica, and the like.

Other conventional adjuncts can also be added to the coating compositions. For example, glycols such as ethylene glycol or propylene glycol can be added to paints at concentrations of up to 30% by weight, to increase their wet-edge time and to further improve their lapping characteristics. Defoamers, pigment dispersants, microbiocides, surfactants, other thickeners, and the like can be used in the usual amounts.

Latex paints containing the acrylamide copolymers of this invention are superior to those containing hydroxyethylcellulose, the most widely used of current thickeners, in providing a more Newtonian, less pseudoplastic balance of low-shear (Stormer) to high-shear (ICI) viscosity. These acrylamide copolymer thickeners afford paints with higher viscosity at high shear rates which means that paint films of greater thickness or "build" can be obtained. These thicker films have increased hiding as well as increased flow and leveling. The superiority of these thickeners, compared with hydroxyethylcellulose or other thickeners, is also manifested by the much higher glosses of dry paint films derived therefrom. Another important characteristic of dry paint films containing the thickeners of this invention is their high degree of block resistance, ordinarily a difficult property to obtain in smooth glossy films of latex paints, but of great practical use because a paint film often comes in contact with other paint films in many areas, such as around windows and doors and in industrial practice where coated boards are stacked as where the top board is laid face to face with the prior board so as to expose only backs of boards to marring during transport and handling.

The amount of the instant thickener required to impart some or all of these properties varies considerably depending upon precise thickener structure, especially hydrophobe size, and thickener molecular weight. In general, however, the usage levels range up to 50 lbs. per 100 gallons of latex paint, with preferred amounts ranging from 2 to 25 lb. per 100 gallons of latex paint, or more preferred 5 to 20 lbs.

Block resistance had been a major deficiency in semigloss and gloss latex paints. The copolymers of this invention can be used as block improvement additives while relying on other thickeners such as hydroxyethylcellulose or acrylic thickeners to provide a viscosity base. Not only are glossy, block resistant films achieved with our polymers, but also paints with improved Stormer (expressed in Krebs units) and ICI viscosity balances (i.e., more Newtonian, less pseudoplastic), and comparable or better flow and leveling. Preferred usage levels for this application range from 1 to 25 lb. per 100 gallons of latex paint in both industrial and trade sales paints.

The blending of polymers of this invention with latex emulsions accomplishes two major objectives: (1) introduction of desirable properties at end use such as improved viscosity balances, flow, leveling, and block resistance, and (2) long term emulsion stabilization. It is of great practical importance to have an emulsion that retains its viscosity and sedimentation stability during normal storage and is also stable under freeze-thaw conditions or mechanical stress. Sedimentation stability is particularly important for latex emulsions with particle diameters greater than 0.2 micron because these latexes tend to separate at ambient temperatures under the influence of gravity. The polymers of this invention function very well in this application, enabling the preparation of stable emulsions with reasonably high solids (i.e., over 40%) without creating unreasonably high processing viscosities (i.e., over 5000 cps). Usage levels may vary from 0.25% to 10% by weight on emulsion solids, with a preferred level of 1 to 5 wt. %.

The acrylamide copolymer of this invention is useful in ink compositions for use in a printing apparatus operating on the so-called "ink jet printing" principle. Ink jet printing is a recent development in the art of applying identifying and decorative indicia to a base. In one system, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge on the base medium which is to receive the decorative or informative printed indicia.

In order to operate satisfactorily in an ink jet printing system, an ink must display a consistent breakup length, drop velocity and drop charge under set machine operating conditions. To achieve these ends, the ink must meet strict requirements with regard to viscosity and resistivity, solubility and compatibility of components, stability and anti-skinning properties and must facilitate rapid cleanup of the machine components with a minimum of effort.

As a flow control adjunct and block improver, or pick release agent, the instant acrylamide copolymer is used, in an effective amount, (preferably 0.1 to 20% by weight of the total ink formulation), in conventional fluid printing inks. Such inks often include three basic components. The first is a colorant for providing visibility of the printed indicia in contrast to the substrate surface. The colorant may be either a dye which is soluble in the ink solvent medium or a pigment which is suspended in the solvent medium. The second component is a resin or binder which remains on the substrate surface after printing and serves to adhere and bind the dye or pigment in position on the substrate surface. The third major component is the solvent which provides fluidity to the ink and carries in solution or suspension the resin and colorant. In addition to these three components which have heretofore been found in nearly all fluid printing inks, various other ingredients may be utilized, including drying, dispersing and wetting agents, plasticizers, diluents, and the like. Ink jet printing inks, in addition to the three basic components above mentioned, may also desirably contain a fourth, optitonal component made appropriate to the ink composition by the nature of the apparatus and process of ink jet printing. This is an electrolyte, which is added so that the ink droplets may be given a strong, reproducibly variable electric charge which in turn enables a controlled, reproducible deflection of the droplets by application of an electrical field to the droplet stream. Printing processes other than ink jet printing do not require inks with electrical properties capable of achieving these ends.

There are many other uses for these copolymers; they reduce the surface tension of aqueous solutions to a considerable extent and are thus useful as surfactants in a wide variety of applications (usage levels range from 0.01 to 20 wt. %, with the preferred levels being 0.1 to 10 wt. %); they are useful as flocculants to clarify aqueous solutions of inorganic materials in the 0.001 ppm to 1000 ppm range; they are adsorbed on the surface of pigment particles (e.g. titanium dioxide) and are capable of functioning as pigment dispersants with usage levels from 0.1 to 5 wt. % on pigment solids; added to conventional water-based ink formulations, they greatly improve the transfer characteristics of the ink during printing operations with usage levels generally from 0.1 wt. % to 20 wt. % on total ink.

In examples and elsewhere herein, parts and percentages are by weight, temperatures in degrees Celsius and measurements are made at room temperature unless otherwise indicated. The following examples are illustrations designed to assist those skilled in the art to practice the present invention but are not intended to limit the invention in any way. The various monomers and other chemicals used in the examples are commercial grade materials unless otherwise specified. Changes and variations may be made without departing from the spirit and scope of the invention as defined by the appended claims. Abbreviations for specific N-substituted acrylamides are sometimes employed wherein the alkyl group is identified by the number of carbon atoms it contains thus N-octylacrylamide is abbreviated as N-C8AM, N-n-octylacrylamide is N-nC8AM, N-decylacrylamide is N-C10AM etc. Other abbreviations are:

| | |
|---|---|
| AM | acrylamide |
| EA | ethyl acrylate |
| MAA | methacrylic acid |
| AM | acrylamide |
| AA | acrylic acid |
| KU | Krebs Units |
| ASTM | American Society for Testing Materials |
| HEMA | hydroxyethyl methacrylates |
| HEC | hydroxyethylcellulose |
| n-DDM | n-dodecyl mercaptan |
| i-PrOH | Isopropanol |
| n-TDM | n-tetradecyl mercaptan |
| n-HDM | n-hexadecyl mercaptan |
| E.S. | emulsion (or latex) solids |
| NVP | N—vinylpyrrolidone |

EXAMPLES

EXAMPLE 1-Preparation of N-octylacrylamide (N-C8AM) via Ritter Reaction

A 2000 ml four-necked flask equipped with a thermometer, condenser, mechanical stirrer and pressure-equalizing addition funnel is charged with 112.2 g of 1-octene (1.0 mole) and 58.3 g of acrylonitrile (1.1 mole). The mixture is cooled to 5° C. and to it is slowly added 392.0 g of 96% sulfuric acid (4.0 mole) such that the temperature does not exceed 20° C. Upon completion of the addition, the mixture is allowed to warm freely. The temperature is then raised to 45° C. for 0.5 hr. to complete the reaction whereupon the product is poured, with stirring, onto 750 g of ice and extracted with two 400 ml portions of diethyl ether. The combined extracts were washed successively with 500 ml of deionized water, 500 ml of 10% aqueous sodium carbonate solution, and 500 ml of deionized water, then dried over anhydrous magnesium sulfate, filtered, and evaporated in vacuo to afford 165.5 g of isomeric N-octylacrylamides. The corresponding monomers based on 1-decene, 1-dodecene, 1-tetradecene, 1-hexadecene, 1-octadecene and 1-docosene are prepared in similar fashion.

EXAMPLE 2-Preparation of N-(n-octyl)acrylamide (N-nC8AM)

A 500 ml four-necked flask equipped with a thermometer, mechanical stirrer, calcium sulfate-filled drying tube, and pressure-equalizing addition funnel is charged with a solution of 45.3 g of acryloyl chloride (0.5 mole) in 180 g of dichloromethane. The solution is cooled to 0° C. and to it is then slowly added a mixture of 66.6 g of n-octylamine (0.5 mole), 50.6 g of triethylamine (0.5 mole), and 125 g of dichloromethane, over a period of 2.5 hrs., at such a rate that the temperature does not exceed 5° C. Upon completion of the addition, the mixture is allowed to warm gradually to ambient temperature. The product is then stored at −15° C. overnight to complete crystallization of the byproduct triethylamine hydrochloride. After removal of the salt by filtration, the filtrate is washed successfully with 250 g of deionized water. The product is then dried over anhydrous magnesium sulfate, filtered, and evaporated in vacuo to afford 85 g of N-(n-octyl)acrylamide, bp. 119°–120° (3 mm).

EXAMPLE 3-Precipitation Copolymerization of AM and N-C8AM (95/5)

A 1000 ml four-necked flask equipped with a thermometer, condenser, mechanical stirrer, and nitrogen ebullator is charged with 47.5 g of acrylamide, 2.5 g of the isomeric N-octylacrylamides (Example 1) and 450 g of ethyl acetate. The mixture is stirred 1.0 hr. under nitrogen and then heated to 60° C. at which point polymerization is initiated by addition of 0.10 g of tert-butyl peroxypivalate (75%) in mineral spirits. After 4.0 hours at 60° C., the mixture is cooled and filtered to yield 49.8 g of product as a friable white solid. When the product polymer is used in Formulation C at a level of 3 wt. % on emulsion solids, the resultant paint has a Stormer viscosity of 75 Krebs Units and an ICI viscosity of 0.4 poise. An analogous precipitation polymer prepared with the N-(n-octyl)acrylamide of example 2 gives a paint with Stormer viscosity of 97 Krebs Units and ICI viscosity of 0.80 poise. For further comparison, a polyacrylamide control prepared under the same conditions affords a paint with Stormer viscosity of 64 Krebs Units and an ICI viscosity of 0.38 poise.

| Formulation C | lbs/100 Gallons |
|---|---|
| Grind | |
| Dispersant (Tamol® 731 Rohm & Haas Co.) | 10.8 |
| Defoamer (Napco NDW® Diamond Shamrock) | 2.0 |
| Propylene Glycol | 59.8 |
| Titanium Dioxide (Zopaque® RCl-9, Glidden-Durkee) | 269.6 |
| Letdown | |
| Propylene Glycol | 57.8 |
| Acrylic polymer (Rhoplex® AC-61, 46.5% solids, Rohm & Haas Co.) | 555.9 |
| Premix | |
| Preservative (Super-Ad-It®, Tenneco Chem.) | 1.0 |
| Coalescent (Texanol®, Eastman Chem.) | 15.7 |

-continued

| Formulation C | lbs/100 Gallons |
|---|---|
| Triton® GR-7 | 2.0 |
| Water | 15.2 |
| Defoamer (Nopco NDW) | 2.9 |
| Thickener/Water | 80.4 |
| | 1073.1 |
| PVC 22.8 | |
| Vol. Solids 34.5 | |
| Wt. Solids 49.2 | |

EXAMPLE 4-AM/N-alkylAM Copolymers

A series of copolymers of acrylamide (95 wt. %) and N-alkylacrylamides, (5 wt. % prepared as in example 1) with alkyl groups of varying size are synthesized by precipitation polymerization as described in Example 3 and evaluated in Formulation C at a level of 3 wt. % on emulsion solids (E. S.). The results, summarized in the accompanying table, illustrate the effect of increasing hydrophobe size on thickener efficiency.

| N—Alkylacrylamides | Formulation Properties | |
|---|---|---|
| ($CH_2$=CHCONHR) | Stormer Visc. (KU) | ICI Visc. (poise) |
| R = H | 64 | 0.38 |
| R = $C_8H_{17}$ | 75 | 0.40 |
| R = $C_{10}H_{21}$ | 90 | 0.68 |
| R = $C_{12}H_{25}$ | 138 | 1.28 |

EXAMPLE 5-Solution Polymerization of AM and N-C10AM

A 3000 ml four-necked flask equipped with a thermometer, condenser, mechanical stirrer, and nitrogen ebullator is charged with 190 g of acrylamide, 10 g of an isomeric mixture of N-decylacrylamides, 414 g of tert-butanol, and 1350 g of deionized water. The mixture is heated under nitrogen to 50° C. whereupon 36 g of isopropanol and a solution of 0.8 g of ammonium persulfate in 20 g of deionized water are added to the flask. An immediate temperature rise occurs, peaking at 84° C. (reflux) and subsiding within 5 minutes. The reaction mixture is maintained at 80° C. for 4.0 hrs. At this point, residual monomer is consumed by addition of a solution of 0.4 g of ammonium persulfate in 10 g of deionized water followed by a 1.0 hr. hold at temperaure. The t-butanol and unreacted isopropanol are then removed with a steam sparge, the temperature of the mixture reaching 100° C. within 0.5 hr. The final product, a colorless translucent dispersion, has a Brookfield viscosity of 3800 cps at 11.4% solids. A polyacrylamide control prepared under the same conditions has a Brookfield viscosity of 800 cps at 12.7% solids.

EXAMPLE 6-Solution Polymerization of AM and N-C10AM with n-DDM Chain Transfer

The copolymer of example 5 was prepared with n-dodecyl mercaptan (0.5 wt. on total monomer) in place of isopropanol as chain transfer agent. When evaluated in a Formulation A the mercaptan-based thickener, at a usage level of 4.5 wt. % on emulsion solids (E. S.), affords virtually the same rheology as the isopropanol-based thickener at a usage level of 5.0 wt. % on emulsion solids. Paint viscosity properties are presented in the following table.

| Chain Transfer Agent | Thickening Usage (wt. % E.S.) | Stormer Visc. (KU) | ICI Visc. (poise) |
|---|---|---|---|
| n-dodecyl mercaptan | 4.5 | 95 | 1.59 |
| Isopropanol | 5.0 | 92 | 1.52 |

EXAMPLE 7-Varying Level of Chain Transfer Agent

A. n-Dodecyl mercaptan (n-DDM)

A series of copolymers consisting of acrylamide (95 wt. %) and the isomeric N-decylacrylamides (5 wt. %) obtainable via the Ritter reaction is prepared with varying levels of n-dodecyl mercaptan as described in example 6 to illustrate the effect of chain transfer agent on thickener performance, in Formulation A at constant ICI viscosity. Results are summarized in the following table.

| n-DDM | Thickening Usage (% on E.S.) | Stormer Visc. (KU) | ICI Visc. (poise) |
|---|---|---|---|
| 0.5 wt % | 4.5 | 95 | 1.57 |
| 1.0 wt % | 6.0 | 86 | 1.50 |
| 2.0 wt % | 8.5 | 79 | 1.58 |

B. 2-Propanol

Copolymers are prepared as in Example 7A with 2-propanol, instead of n-DDM, as the chain transfer agent and evaluated at 3%, by weight, in the paint formulation used in Examples 3 and 4. Weight average molecular weight is determined by light scattering employing a low angle laser light scattering photometer (Chromatix Model KMX-6). Because of the possible presence of gel the values are considered approximate. Results are summarized in the following table.

| Wt. % 2-Propanol | Stormer Visc. (KU) | ICI Visc. (poise) | Wt. Avg. Molec. Wt. |
|---|---|---|---|
| 0 | 121 | 1.02 | |
| 1 | 81 | 0.83 | partly gel |
| 2 | 71 | 0.68 | 450,000 |
| 4 | 59 | 0.47 | 100,000 |

C. In Aqueous Solution

Copolymers of examples 7A and 7B, are used to thicken water with the following results:

| Chain Transfer Agent | % Solids | Brookfield Visc. (CPS) |
|---|---|---|
| 0 | 12.1 | 64,000 |
| 0.5% 2-propanol | 11.5 | 6,100 |
| 1.0% 2-propanol | 12.1 | 3,100 |
| 2.0% 2-propanol | 12.3 | 1,860 |
| 4.0% 2-propanol | 12.0 | 210 |
| 0.5% n-DDM | 16.3 | 21,500 |
| 1.0% n-DDM | 16.6 | 5,150 |
| 2.0% n-DDM | 15.9 | 1,150 |

EXAMPLE 8-Varying N-C10AM Level

Several copolymers of acrylamide with varying levels of N-decylacrylamide are prepared as described in example 5 to illustrate the effect of hydrophobe level on thickener performance. Formulation A is employed in this series with a thickener usage of 4.7 wt. % on emulsion solids. Results are summarized in the following table.

| Thickener Composition (wt. %) | Stormer Visc. (KU) | ICI Visc. (poise) |
|---|---|---|
| 95 AM/5 N-C10AM | 74 | 1.21 |
| 94 AM/6 N-C10AM | 101 | 1.57 |
| 92.5 AM/7.5 N-C10AM | 134 | 1.88 |

EXAMPLE 9-Stearoyl Peroxide Initiator

A copolymer of acrylamide (95 wt. %) and the isomeric N-dodecylacrylamides (5 wt. %) obtained by the Ritter reaction, is prepared by precipitation polymerization in ethyl acetate, as described in example 3, using stearoyl peroxide as the initiator in place of t-butyl peroxypivalate. A 3% aqueous solution of the stearoyl peroxide-based product has a Brookfield viscosity of 120 cps compared with 55 cps for the corresponding product generated with t-butyl peroxypivalate.

EXAMPLE 10-Copolymers with Acid Units

Several terpolymers of acrylamide, acrylic acid, and the isomeric N-dodecylacrylamides are prepared by precipitation polymerization in ethyl acetate as described in example 3. The viscosites of 3% aqueous solutions of the terpolymer thickeners, at pH 3.5-3.7 and 21° C., are summarized in the following table.

| Thickener Composition (wt. %) | Brookfield Visc. (cps) |
|---|---|
| 90 Am/10 N-C12AM | 165 |
| 88 AM/2AA/10 N-C12AM | 75 |
| 85 AM/5AA/10 N-C12AM | 105 |
| 70 AM/20AA/10 N-C12AM | 1300 |
| 70 AM/20AA/10 N-C12AM | 1300 |

EXAMPLE 11-Preparation of N-octadecyloxypoly(ethyleneoxy)$_{20}$methylacrylamide A 500 ml four-necked flask equipped with a thermometer, mechanical stirrer, condenser, and Dean-Stark trap is charged with 135 g of toluene and 100 g of a commercial octadecyl alcohol ethoxylate having an average of 20 ethyleneoxy units per molecule (Brij ® 78, 93.5 meg). The ethoxylate is dried by azeotropic distillation and then admixed with 34.6 g of N-isobutoxymethylacrylamide (85%, 18.7 meg) and 2.7 g of maleic acid (23.3 mmoles). The reaction mixture is heated at 100° C. for 1.5 hrs. and then stripped of volatiles in vacuo at 60° C. Conversion is 78.3% based on isobutanol formed and 77% based on recovered N-isobutoxymethacrylamide. Residual catalyst is quenched by the addition of 4.7 g of triethylamine (47 mmole).

EXAMPLE 12-Copolymer of AM and Example 11 Monomer (86/14 wt. %)

A 1000 ml four-necked flask equipped with a thermometer, condenser, mechanical stirrer and nitrogen ebullator is charged with 43.0 g of acrylamide, 7.0 g of crude N-octadecyloxypoly (ethyleneoxy)$_{20}$methylacrylamide, 360 g of deionized water, and 90 g of isopropanol. The mixture is stirred 1.0 hr. under nitrogen and then heated to 80° C. whereupon polymerization is initiated with a solution of 0.1 g of ammonium perfulfate in 0.9 g of deionized water. After 2.75 hrs. at temperature, the reaction is terminated, affording a clear, colorless polymer solution with Brookfield viscosity of 6300 cps at 10% solids. By comparison, an acrylamide homopolymer prepared under the same conditions has a Brookfield viscosity of 40 cps at 10% solids.

EXAMPLE 13-Paints Employing AM Copolymer Thickeners

A number of acrylamide/N-alkylacrylamide copolymers with varying levels of the N-alkylacrylamide and with N-alkylacrylamides of varying size are synthesized via the procedures described in examples 3, 5, and 6. These acrylamide/N-alkylacrylamide copolymers (12% solids in water) are then used to prepare acrylic latex paints based on the following formulation.

| FORMULATION A | |
|---|---|
| | lbs./100 gallons |
| Grind | |
| Dispersant (hydroxyethyl methacrylate-methacrylic acid copolymer) | 7.0 |
| Defoamer (Foamaster VL ®, Diamond Shamrock) | 2.0 |
| Propylene Glycol | 40.0 |
| Titanium Dioxide (Zopaque ® RCl-9 rutile, Glidden-Durkee) | 214.7 |
| Ethylene Glycol | 20.0 |
| Let-Down | |
| Water | 100.0 |
| Acrylic Polymer (Rhoplex ® AC-996, Rohm and Haas Co.) 60.5% solids | 436.0 |
| Premix | |
| Coalescent (Texanol ®,* Eastman Chem.) | 11.0 |
| Preservative (Super-Ad-it, Tenneco Chem.) | 1.0 |
| Defoamer (Foamaster VL) | 2.0 |
| Water | 30.0 |
| Aqueous Thickener Solution, conc. adjusted as desired | 173.4 |
| Total | 1037.1 |
| Pigment Volume Concentration: 18.5% | |
| Volume Solids: 34.0% | |
| Weight Solids: 44.8% | |

*Texanol is believed to be 2,2,4-trimethylpentanediol-1,3,monoisobutyrate.

Included, for purposes of comparison, are Formulation A paints prepared with an anionic acrylic thickener (13 J) having an acid number 74.4, disclosed in U.S. Pat. No. 4,151,144, herein incorporated by reference, and hydroxyethylcellulose (13 K), Natrosol 250 MR, a product of Hercules, Inc. Usage levels and acrylamide copolymer thickener compositions are given in Table I.

TABLE I

| Example | Thickener Composition | Chain Transfer Agent (wt. %) | Usage[2] |
|---|---|---|---|
| 13A[1] | 95AM/5 N-C8AM | None | 20.8 |
| 13B | " | 2.0% i-PrOH[3] | 15.8 |
| 13C | 90AM/10 N-C8AM | 2.0% i-PrOH[3] | 13.2 |
| 13D | 96AM/4 N-C10AM | 4.0% i-PrOH[3] | 23.2 |
| 13E | 95AM/5 N-C10AM | 2.0% i-PrOH[3] | 13.2 |
| 13F | " | 1.0% n-DDM[4] | 13.2 |
| 13G | " | 0.5% n-DDM[4] | 11.9 |
| 13H | 97AM/3 N-C12AM | 4.0% i-PrOH[3] | 18.5 |
| 13I | " | 5.0% i-PrOH[3] | 17.2 |
| 13J | anionic acrylic | — | 15.8 |
| 13K | hydroxyethylcellulose | — | 5.2 |

Notes:
[1]Thickener copolymer of Example 13A is prepared by precipitation, polymerization; the others by solution polymerization.
[2]In Formulation A, lbs/100 gallons paint.
[3]Wt % isopropanol in total solvent.
[4]Wt % n-dodecyl mercaptan on total monomer.

Table II contrasts the properties of paints and paint films containing thickeners of this invention (Examples 13 A-I) with those of the paints and paint films containing the acrylic thickener (13J) and hydroxyethylcellulose (13K). It is evident that the viscosities, glosses, flow and leveling, block resistance, alkali resistance, and abrasive scrub resistance obtained with the acrylamide copolymers are, on balance, superior to the corresponding properties obtained with the other thickeners.

In this and other paint examples, the properties recorded include the following:

Stormer viscosity, expressed in Krebs Units (KU), is a low shear viscosity, measured at a shear rate of ca. $10^{-1}$ sec$^{-1}$. It is desired that the room temperature Stormer viscosity of paint be between 65 and 120 KU with 70 to 110 being preferred.

High Shear (ICI) viscosity is measured by an ICI Cone and Plate Viscometer (Research Equipment Ltd., London) operated at a shear rate of ca. 10,000 sec.$^{-1}$ to simulate the shear applied to paint during brushing. Generally, as ICI viscosity increases, film thickness ("build") also increases. Good film build results in increased hiding power for the paint and also contributes to improved flow and leveling. It is desired the ICI viscosity of paint, at room temperature, be between 0.5 and 3 poise with 0.8 to 2.5 poise being preferred.

Gloss, at 60° and 20°, is determined by instrumental measurement (ASTM D 523) on films dried 48 hrs. after brushout on a Leneta Form 12H Spreading Rate Chart (Leneta Co., Ho-Ho-Kus, N.J. 07423).

Flow and leveling are determined by a visual examination of brush marks on a Leneta Form 12H Spreading Rate Chart. Ratings are on a 0-10 scale where 10 is exceptionally superior flow and leveling and 0 represents totally unacceptable flow and leveling.

Block resistance is determined by a "tack" rating on conditioned film cast with a 3 mil opening Bird drawn-down applicator on a Leneta Form 5C chart. The films are dried at 77° F. (25° C.), 50% relative humidity for one week. Two 1.5 inch square (3.8×3.8 cm) pieces cut out of the chart are then placed in a 120° F. (°C.) or 140° F. (°C.) oven with the film surfaces face-to-face under pressure beneath a No. 8 rubber stopper (3.2 cm. dia.) topped with a 1 kg, temperature equilibrated weight. After 30 minutes, the films are removed from the oven and allowed to cool at ambient temperature over a period of 15 minutes. The film sections are then separated with a slow, steady force and rated for the amount of observed tack where 10 is exceptionally little tack ("tack-free") and 0 is unacceptable tack resulting in a complete seal of the film surfaces.

Alkali resistance is gauged by the initial and final gloss (60°) measured first on a dry paint film (1 week at 77° F. 50% relative humidity) cast from a 23 mil Bird applicator on a P-121-10N black vinyl Leneta chart and then on the same dry film after a 500 cycle scrub in a 1% Tide ® bath using a Gardner Scrub machine equipped with a 1 lb. abrasion boat wrapped with a cheesecloth pad. The higher the final gloss, the more resistant the paint film.

Abrasive Scrub resistance is determined by the method of ASTM D 3486; the higher the number of cycles, the more resistant the paint film.

TABLE II

| | Viscosities | | Gloss | | | Block Resist. | Alkali Resist 60° Gloss | | Abrasive Scrub |
| | Stormer | ICI | | | | | | | |
| Ex. | (KU) | (Poise) | 60° | 20° | Flow-Level | 120° F. | Init | Final | Fail Cycles |
|---|---|---|---|---|---|---|---|---|---|
| 13A | 90 | 1.48 | 84 | 46 | 8 | 0 | 79 | 71 | 881 |
| 13B | 88 | 1.80 | 83 | 46 | 8 | — | — | — | — |
| 13C | 95 | 1.58 | 86 | 50 | 8 | — | — | — | — |
| 13D | 71 | 1.55 | 75 | 31 | 9 | 6 | 76 | 66 | 1018 |
| 13E | 92 | 1.59 | 85 | 51 | 8 | 6 | 82 | 77 | 1118 |
| 13F | 89 | 1.60 | 86 | 53 | 9 | 6 | 82 | 72 | 1454 |
| 13G | 95 | 1.87 | 84 | 48 | 8 | — | — | — | — |
| 13H | 86 | 1.92 | 75 | 29 | 9 | 5 | 79 | 71 | 1072 |
| 13I | 100 | 1.61 | 84 | 48 | 8 | — | — | — | — |
| 13J | 89 | 1.72 | 71 | 33 | 9 | 0 | 76 | 64 | 1128 |
| 13K | 74 | 0.57 | 13 | 2 | 5 | 4 | 9 | 9 | 1167 |

EXAMPLE 14-Block Resistance of Paint Films

Acrylic latex paints are prepared according to Formulation A, defined in example 13, and Formulation B, defined below. Formulation A is thickened with 13.2 solid lbs. of the anionic acrylic thickener of example 13 J per 100 gallons of latex paint, while Formulation B is thickened with 1.8 solid lbs. of hydroxyethylcellulose per 100 gallon of latex paint. Added to these fomulations are varying amounts of the acrylamide/N-alkylacrylamide copolymer of example 13 E. Paint films are then evaluated for block resistance as described in example 13, Table II. The results are summarized in Table III. From these data, it is quite clear that the copolymers of this invention remarkably improve the block resistance of tested films.

| FORMULATION B | |
|---|---|
| Material | lbs./100 gallons |
| Grind | |
| Dispersant (as in Formulation A) | 7.7 |
| Defoamer (Nopco NDW, Diamond Shamrock) | 2.0 |
| Propylene Glycol | 69.8 |
| Titanium Dioxide, rutile (Zopaque® RCl-9 Glidden-Durkee) | 269.6 |
| Let-Down | |
| Propylene Glycol | 47.8 |
| Acrylic Polymer Emulsion 46% Solids (Rhoplex® AC-490, Rohm and Haas Co.) | 555.9 |
| Premix | |
| Coalescent (Texanol) | 15.7 |
| Preservative (Super Ad-it) | 1.0 |
| Defoamer (Nopco NDW) | 2.9 |
| Wetting Agent (dioctyl sodium sulfosuccinate) | 2.0 |
| Water | 15.2 |
| Thickener Solution (as noted above) | 83.5 |
| | 1073.1 |
| Pigment Volume Concentration: 22.8% | |
| Volume Solids: 34.5% | |
| Weight Solids: 49.2% | |

EXAMPLE 15-Printing Ink Transfer Additive

An acrylamide copolymer of this invention (the thickener of example 13E) is added to a standard aqueous test ink formulation consisting of 2 parts pigment (BT 4270), 1 part aqueous colloidal dispersion of a base soluble carboxylated styreneacrylic copolymer (at 30% solids), and 2 parts styrenated acrylic let-down emulsion at a total formulation solids of 41.2%. A similar ink let-down with Lucidene® 361 (a product of Morton Chemical Co.), without modifying additives, is used as a commercially acceptable control. Ink properties are then determined including (1) Brookfield viscosity, (2) ICI viscosity, (3) transfer from an Anilox roller (165 line), (4) heat-aged stability (7 days, 60° C.), and (5) wet/dry ink rub resistance. Results are summarized in Table IV. It is clearly evident from the data that inks modified with the copolymers of this invention transfer better than the commercial control. All other properties examined are comparable to those of the control.

TABLE IV

| Ink Property | Control Ink | Test Ink No. 1 | Test Ink No. 2 |
|---|---|---|---|
| % Solids | 43.5 | 43.5 | 41.2 |
| Acrylamide Copolymer | None | None | Ex. 16 E |
| Wt. % Acrylamide Copolymer | None | None | 0.55 |
| Brookfield Viscosity (cps) | 110 | 75 | 95 |
| ICI Viscosity (cps) | 45 | 10 | 32.5 |
| Anilox Transfer[1] | | — | + |
| Heat-Aged Stability[2] | | | |
| Inital pH/Visc. (cps) | 5.0/110 | 8.0/75 | 8.0/95 |
| Final pH/Visc. (cps) | 8.0/840 | 8.0/160 | 8.0/210 |
| Dry Rub[3] | | = | ≐ |

TABLE III

| Formulation Type | AM Polymer lbs/100 gallons | Viscosity Stormer (KU) | ICI (poise) | Gloss 60° | 20° | Flow/ Level | Block Resist 120° F. | 140° F. |
|---|---|---|---|---|---|---|---|---|
| A | 0 | 78 | 1.29 | 75 | 37 | 9 | 0 | 0 |
| " | 1.3 | 86 | 1.58 | 79 | 39 | 9 | 4 | 0 |
| " | 2.6 | 91 | 1.75 | 76 | 38 | 9 | 6 | 5 |
| " | 5.3 | 103 | 2.21 | 80 | 45 | 8 | 6 | 6 |
| B | 0 | 76 | 0.78 | 68 | 20 | 2 | 3 | 0 |
| " | 2.6 | 85 | 1.10 | 67 | 18 | 2 | 8 | 6 |
| " | 3.5 | 88 | 1.22 | 67 | 19 | 2 | 8 | 6 |

TABLE IV-continued

| Ink Property | Control Ink | Test Ink No. 1 | Test Ink No. 2 |
|---|---|---|---|
| Wet Rub[4] | | = | = |

[1]The test ink and control at essentially equal solids and viscosity are rolled out simultaneously with an Anilox hand proofer. A visual comparison of the color strength of the applied inks affords an indication of relative ink transfer. A "+" sign denotes that the test ink is darker than the control and thus transfers better while a "−" sign denotes that the test ink is lighter than the control and doesn't transfer as well.
[2]Test Conditions: 7 days, 60° C., Brookfield Viscosity
[3]Test Conditions: 100 rubs, 2 lbs., Sutherland machine; the "=" sign denotes that the test ink and control are comparable in ink resistance.

sion solids) as described in Example 13. The results are summarized in Table V.

With the copolymers of the linear N-alkylacrylamides and the isomeric N-sec-acrylamides obtained by the Ritter reaction, there is a clear improvement in thickening efficiency, at the cited usage levels, when the alkyl group has eight or more carbon atoms. While paints with a useful rheology balance can be prepared with some of the lower N-alkylacrylamides at higher usage levels, other properties suffer. Similar effects are seen with the N-tert-alkylacrylamides.

TABLE V

| Composition (Wt. %) | Use Level (% on E.S.) | Stormer Visc. (KU) | ICI Visc. Poise | Gloss 60°/20° | Flow | Block Resist. 120° F./140° F. |
|---|---|---|---|---|---|---|
| 96.6 AM/3.4 N-nC4AM | 7.0 | 57 | 0.60 | — | — | — |
| 95.7 AM/4.3 N-nC6AM | 7.0 | 58 | 0.87 | — | — | — |
| 95.0 AM/5.0 N-nC8AM | 7.0 | 112 | 2.60 | 87/66 | 8 | 9/8 |
| 96.6 AM/3.4 N-nC4AM | 15.0 | 69 | 1.93 | 31/4 | 10 | 0/0 |
| 95.7 AM/4.3 N-nC6AM | 15.0 | 84 | 3.09 | 68/21 | 9 | 8/0 |
| 95.0 AM/5.0 N-nC8AM | 15.0 | >141 | >5.00 | — | — | — |
| 95.7 AM/4.3 N-sC6AM | 7.0 | 57 | 0.64 | — | — | — |
| 95.0 AM/5.0 N-sC8AM | 7.0 | 61 | 1.10 | — | — | — |
| 95.7 AM/4.3 N-sC6AM | 15.0 | 72 | 2.23 | 39/6 | 10 | 0/0 |
| 95.0 AM/5.0 N-sC8AM | 15.0 | 100 | 3.70 | 80/43 | 9 | 8/1 |

[4]Test Conditions: 10 rubs by hand

EXAMPLE 16-Thickening a Vinyl Acetate-Based Latex Paint

A copolymer of acrylamide (95 wt. %) and the isomeric N-sec-decylacrylamide (5 wt. %) obtainable via the Ritter reaction is prepared according to Example 5 and formulated with a vinyl acetate-based emulsion (51.3% solids) as hereinbelow described. The resultant paint has a Stormer viscosity of 81 KU, an ICI viscosity of 1.89 poise, and a flow rating of 7 (10=best).

| Vinyl Acetate Formulation | |
|---|---|
| Component | Lbs. |
| Tamol ® 731 (Dispersant, 25% Solids, Rohm and Haas Co.) | 10.8 |
| Nopco NDW ® (Defoamer, Diamond Shamrock) | 2.0 |
| Propylene glycol | 59.8 |
| Titanium dioxide (Zopaque ® RCl-9, rutile, Glidden-Durkee, Div. SCM) | 296.6 |
| Letdown | |
| Propylene glycol | 57.8 |
| Vinyl acetate emulsion (51.3% Solids) | 513.2 |
| Premix | |
| Super-Ad-It ® (Preservative, Tenneco Chemicals) | 1.0 |
| Water | 15.2 |
| 2,2,4-Trimethylpentanediol-1,3-monoisobutyrate (Eastman Chemical) | 15.7 |
| Dibutyl phthalate | 6.8 |
| Triton ® GR-7 (Surfactant, Rohm and Haas Co.) | 2.0 |
| Nopco NDW | 2.9 |
| Copolymer of this invention (12.9% solids in water) | 102.0 |
| Water | 29.1 |

EXAMPLE 17-Variation in the N-alkylacrylamide Comonomers

A series of copolymers of acrylamide and equimolar levels of N-alkylacrylamides with alkyl groups of varying size are prepared as described in Example 5. The tert-butanol is then removed in vacuo to afford the products in water alone. These copolymers are formulated in paint at two levels (7.0 and 15.0 wt. % on emul-

EXAMPLE 18-Variations in N-Alkylacrylamide Comonomer and Mercaptan Chain Transfer Agent; Gradual Addition Polymerization Copolymers of acrylamide and equimolar levels of the isomeric N-sec-dodecyl, N-sec-tetradecyl-, and N-sec-hexadecylacrylamides, respectively, are prepared in 75 water/25 tert-butanol by a gradual addition procedure (as described below) using the corresponding N-alkyl mercaptans as chain transfer agent. The resulting products are formulated with Rhoplex AC-996, as described in Example 13, and evaluated. Results are summarized in Table VI.

It is apparent from the date therein that the higher N-alkylacrylamides, even at relatively low levels, afford useful copolymers for thickening latex paints.

The gradual addition polymerization is illustrated by the preparation of a copolymer of acrylamide (95 wt. %) and isomeric N-sec-decylacrylamides (5 wt. %), as follows:

A 2000 ml. four-necked flask equipped with a thermometer, condenser, mechanical stirrer, nitrogen ebullator, and three feed lines is charged with 236.4 g. deionized water and 78.8 g. tert-butyl alcohol. The mixture is sparged 1.0 hr. with nitrogen and then heated to 80° C. at which point 10% of the total initiator feed (0.12 g. ammonium persulfate in 11.0 g. deionized water) is added to the flask. Solutions of the monomers (285.0 g. acrylamide in 584.0 g. deionized water and 162.3 g. tert-butyl alcohol; 15.0 g. isomeric N-sec-decylacrylamides and 1.5 g. n-dodecyl mercaptan in 74.0 g. tert-butyl alcohol and 3.0 g. deionized water) and the remaining initiator (1.08 g. ammonium persulfate in 99.0 g. deionized water) are then gradually fed to the flask over a period of 1.0 hr. After a 1.0 hr. hold at temperature (80° C.), residual monomer is chased with a solution of 0.6 g. ammonium persulfate in 10.0 g. deionized water followed by a 1.0 hr. hold at a temperature. The tert-butyl alcohol is then removed via a steam sparge to afford the product as a translucent dispersion in water (solids: 18.7%; Brookfield Viscosity: 42,500 cps., spindle No. 4, 6 rpm, 25° C.).

TABLE VI

| Composition (Wt. %) | Mercaptan Wt. % | Use Level (% on E.S.) | Stormer Visc. (KU) | ICI Visc. (Poise) | Gloss 60°/20° | Flow (0-10) | Block Resist. 120° F./140° F. |
|---|---|---|---|---|---|---|---|
| 99.50 AM/0.50 N-C12AM[1] | n-DDM/0.50 | 2.0 | 54 | 0.46 | 69/18 | 10 | 0/0 |
| 99.50 AM/0.50 N-C12AM[1] | n-DDM/0.50 | 8.0 | 81 | 2.68 | 85/56 | 10 | 6/6 |
| 98.00 AM/2.00 N-C12AM[2] | n-DDM/0.50 | 2.0 | 56 | 0.55 | 81/38 | 10 | 6/5 |
| 98.00 AM/2.00 N-C12AM[2] | n-DDM/0.50 | 8.0 | 97 | 3.13 | 86/61 | 8 | 7/7 |
| 99.44 AM/0.56 N-C14AM[1] | n-TDM/0.57 | 5.0 | 77 | 1.79 | 84/51 | 10 | 6/5 |
| 97.77 AM/2.23 N-C14AM[2] | n-TDM/0.57 | 5.0 | 103 | 2.13 | 86/59 | 8 | 6/6 |
| 99.38 AM/0.62 N-C16AM[1] | n-HDM/0.64 | 2.0 | 61 | 0.65 | 71/20 | 10 | 0/0 |
| 99.38 AM/0.62 N-C16AM[1] | n-HDM/0.64 | 8.0 | 131 | 3.38 | 86/52 | 9 | 6/5 |
| 97.53 AM/2.47 N-C16AM[2] | n-HDM/0.64 | 2.0 | 90 | 0.90 | 85/56 | 8 | 6/5 |
| 97.53 AM/2.47 N-C16AM[2] | n-HDM/0.64 | 8.0 | 141 | 3.40 | 83/23 | 1 | 6/6 |

[1] N—Alkylacrylamide Comonomer: 2.09 mmole/100 g. total monomer.
[2] N—Alkylacrylamide Comonomer: 8.37 mmole/100 g. total monomer.
[3] Mercaptan Level: 2.47 mmole/100 g. total monomer.

EXAMPLE 19-Block Improvement Additive in Vinyl Topcoat Formulations

A copolymer of acrylamide (95 wt. %) and the isomeric N-sec-decylacrylamides (5 wt. %) obtainable by the Ritter reaction is prepared as described in Example 5. The tert-butanol is then removed in vacuo to afford a translucent dispersion of the copolymer at 16.9% solids in water (Brookfield Viscosity: 24,000 cps).

This copolymer is evaluated in a clear vinyl topcoat formulation as a rheology modifier/block improvement additive in comparison with a currently used commercial thickener. The topcoat formulation is based on a vinyl printing and finishing acrylic copolymer emulsion. Emulsion E-1691, 41.5% solids, Rohm and Haas Company, and comprises a flatting agent, a leveling agent, a surfactant, a coalescent, sodium bicarbonate and water to bring the E-1691 solids to 25% of the formulation. For a control, Acrysol TT-678 (Rohm and Haas Company, 60% solids) thickener is added in the amount of 2% of the formulation. The test material has 4.5% of the formulation added in the form of a 17.0% solids solution of the copolymer of this invention.

The formulated coatings are applied to an automotive vinyl (Chrysler interior upholstery vinyl) using a number 20 wire wound rod, then dried 1.0 minute at 180° F. to give films 0.3 to 0.4 mils thick. The films are tested for block by a modified Fisher Body test, Method 31-6, modified to make the test more stringent by being run at 180° F., 1.5 psi and 24 hour duration as compared to the standard test conditions of 175° F., 0.5 psi and 30 minutes. Block is evaluated in the range from 1.0 to 5.0 (worst) with six independent evaluations being averaged. The film made from the control formulation has a block rating of 5.0, which is unacceptable, whereas the film made using the acrylamide copolymer formulation has a rating of 1.2, which is very good.

EXAMPLE 20-Copolymers of Acrylamide and N-tert-Octylacrylamide; Varying Composition and Use Level Copolymers of acrylamide and N-tert-octylacrylamide are prepared as described in Example 5. The tert-butanol is then removed in vacuo to afford the copolymer in water alone. These products are formulated with Rhoplex AC-996 as described in Example 13 and evaluated. Results are summarized in Table VII.

TABLE VII

| Wt. % N—tC8AM | Use Level (% on E.S.) | Stormer Visc. (KU) | ICI Visc. (Poise) | Gloss 60°/20° | Flow (0-10) | Block Resist. 120° F./140° F. |
|---|---|---|---|---|---|---|
| 5 | 7.0 | 58 | 0.81 | — | — | — |
| 5 | 10.0 | 64 | 1.43 | — | — | — |
| 5 | 15.0 | 84 | 3.01 | 68/22 | 8 | 8/0 |
| 10 | 7.0 | 79 | 1.71 | 85/57 | 9 | 8/0 |
| 20 | 3.0 | 102 | 0.88 | 94/60 | 5 | 8/2 |
| 20 | 7.0 | >141 | 1.80 | — | — | — |

EXAMPLE 21-98AM/2 N-C22AM Copolymer and Paint Prepared Therefrom

A copolymer of acrylamide (98 wt. %) and the isomeric N-sec-docosylacrylamides (2 wt. %) obtained via the Ritter reaction in synthesized by precipitation polymerization (10% solids in ethyl acetate) at 60° C. using t-butyl peroxypivalate (Lupersol 11, 0.2 wt. % on monomer) as initiator. This copolymer is used to prepare a paint of Formulation D at a level of 3.0 wt. % on emulsion solids. The resultant paint has a Stormer viscosity of 74 KU, an ICI viscosity of 1.20 poise and a flow rating of 9. On application, the paint afforded films with a brushout gloss of 77/33 (60°/20°), and block rating of 8/6 (120° F./140° F.).

| FORMULATION D | |
|---|---|
| | lbs/100 Gallons |
| Grind | |
| Dispersant (Tamol® 731, Rohm and Haas Co.) | 10.8 |
| Defoamer (Nopco® NDW, Diamond Shamrock) | 2.0 |
| Propylene Glycol | 59.8 |
| Titanium Dioxide (Zopaque® RCl-9, rutile, Glidden-Durkee) | 269.6 |
| Let-Down | |
| Propylene Glycol | 57.8 |
| Acrylic Polymer (Rhoplex® AC-490, 46% solids, Rohm & Haas Co.) | 561.9 |
| Premix | |
| Preservative (Super-Ad-It, Tenneco Chem.) | 1.0 |
| Water | 9.2 |
| Coalescent (Texanol, Eastman Chem.) | 15.7 |

-continued

| FORMULATION D | |
|---|---|
| | lbs/100 Gallons |
| Triton ® GR-7 | 2.0 |
| Defoamer (Napco NDW) | 2.9 |
| Thickener Solution | 80.4 |
| | 1073.1 |

PVC - 22.8%
Volume Solids - 34.5
Weight Solids - 49.2

EXAMPLE 22-Polymers of Acrylamide,
N-Alkylacrylamides, and Other Water Soluble
Monomers Polymers of acrylamide, the isomeric N-sec-decyla-crylamide obtained by the Ritter reaction, and other water soluble monomers such as N-vinylpyrrolidone (NVP) or 2-hydroxyethyl methacrylate (HEMA) are prepared by the general procedure of Example 5. The tert-butanol is then removed in vacuo to afford the products in water alone. The polymers are formulated with Rhoplex AC-996, as described in Example 13, and evaluated. Results are summarized in Table VIII.

TABLE VIII

| Composition (Wt. %) | Use Level (% on E.S.) | Stormer Visc. (KU) | ICI Visc. (Poise) | Gloss 60°/20° | Flow | Block Resist. 120° F./140° F. |
|---|---|---|---|---|---|---|
| 85 AM/10 HEMA/5 N-C10AM | 4.0 | 85 | 1.18 | 87/59 | 8 | 8/7 |
| 85 AM/10 HEMA/5 N-C10AM | 7.0 | 118 | 2.49 | 87/64 | 8 | 9/8 |
| 75 AM/20 HEMA/5 N-C10AM | 4.0 | 81 | 1.02 | 86/59 | 8 | 8/7 |
| 75 AM/20 HEMA/5 N-C10AM | 7.0 | 116 | 2.21 | 87/61 | 7 | 9/7 |
| 65 AM/30 HEMA/5 N-C10AM | 3.0 | 73 | 0.69 | 86/56 | 8 | 8/6 |
| 65 AM/30 HEMA/5 N-C10AM | 7.0 | >141 | 2.19 | — | — | — |
| 85 AM/10 NVP/5 N-C10AM | 7.0 | 81 | 1.63 | 86/61 | 10 | 9/8 |
| 75 AM/20 NVP/5 N-C10AM | 7.0 | 72 | 1.23 | 86/63 | 10 | 9/8 |
| 65 AM/30 NVP/5 N-C10AM | 7.0 | 58 | 0.78 | — | — | — |
| 65 AM/30 NVP/5 N-C10AM | 15.0 | 79 | 2.51 | 86/64 | 9 | 9/3 |

We claim:

1. A nonionic or anionic water-soluble addition copolymer of monomers comprising, by weight,
   (A) at least 50% of acrylamide;
   (B) 0.01 to 50% of a compound having the formula $$CH_2=CH-\overset{O}{\underset{\|}{C}}-\overset{R_1}{\underset{|}{N}}-R_2$$

wherein
   $R_1$ is $$-(CH_2CHO)_n R_4,$$
with $R_3$ substituent $R_2$ is H or $$-(CH_2CHO)_m R_6,$$
with $R_5$ substituent $R_3$ and $R_5$ are H or methyl, independently,
   $R_4$ and $R_6$ are hydrocarbyl having 6 or more carbons, independently, and
   m and n are zero or a positive integer, independently; and
   (C) 0 to 49.99% one or more other olefinically unsaturated monomers;

the copolymer having a weight average molecular weight greater than 30,000.

2. The copolymer of claim 1 wherein $R_4$ is $C_6$ to $C_{36}$ alkyl.

3. The copolymer of claim 2 wherein $R_2$ is H.

4. The copolymer of claim 3 wherein the monomers comprise 0.05 to 40% (B) and the average molecular weight is about 50,000 to about 1 million.

5. The copolymer of claim 4 wherein $R_4$ is $C_8$ to $C_{18}$ alkyl.

6. The copolymer of claim 5 wherein at least 50%, by weight, of the other olefinically unsaturated monomers are water-soluble monomers.

7. The copolymer of claim 6 wherein $R_4$ is $R_7R_8CH-$ wherein $R_7$ and $R_8$ are alkyl, and n is zero.

8. The copolymer of claim 1 wherein $R_2$ is H, n is 1 to 50, and the monomers comprise 0.2 to 20% (B).

9. The copolymer of claim 8 wherein $R_4$ is $C_6$ to $C_{36}$ alkyl or aralkyl and wherein the averge molecular weight is from 50,000 to 1,000,000.

10. The copolymer of claim 4 or claim 8 prepared in the presence of a mercaptan chain transfer agent having 8 or more carbon atoms.

11. The copolymer of claim 6 or claim 9 prepared in the presence of an alkyl mercaptan chain transfer agent having 12 to 22 carbon atoms.

12. The copolymer of claim 4 or claim 8 wherein up to 30% by weight of the monomers are water-soluble other olefinically unsaturated monomers.

13. The copolymer of claim 6 or claim 9 wherein up to 30% by weight of the monomers are other olefinically unsaturated monomers selected from N-vinylpyrrolidone, hydroxyethyl methacrylate, hydroxyethyl acrylate, acrylic acid or methacrylic acid.

14. The copolymer of claim 7 the monomers consisting essentially of
   (A) acrylamide;
   (B) 0.05 to 40% of a compound having the formula $$CH_2=CH-\overset{O}{\underset{\|}{C}}-\overset{R_4}{\underset{|}{N}}-H; \text{ and}$$

(C) 0 to 30% N-vinylpyrrolidone, hydroxyethyl acrylate, hydroxyethyl methacrylate, methacrylic acid, acrylic acid, or a mixture of these;
having a weight average molecular weight between 100,000 and 700,000.

15. The copolymer of claim 7 the monomers consisting essentially of
   (A) acrylamide and
   (B) Y to Z% of a compound having the formula

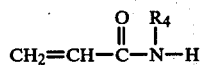
wherein Y and Z are:
| Number of Effective Carbons in R$_4$ | Y | Z |
|---|---|---|
| 6 to 9 | 2 | 40 |
| over 9 to 12 | 0.5 | 30 |
| over 12 to 15 | 0.4 | 20 |
| over 15 to 18 | 0.2 | 10 |
| over 18 | 0.05 | 8 |
16. The copolymer of claim 14 wherein monomer (B) is 0.2 to 20% and (C) is 0 to 20%, by weight.
17. The copolymer of claim 15 wherein Y and Z are
| Number of Effective Carbons in R$_4$ | Y | Z |
|---|---|---|
| 6 to 9 | 4 | 20 |
| over 9 to 12 | 1 | 15 |
| over 12 to 15 | 0.5 | 10 |
| over 15 to 18 | 0.4 | 8 |
| over 18 | 0.2 | 5 |
* * * * *